United States Patent [19]

Tran et al.

[11] Patent Number: 5,406,286
[45] Date of Patent: Apr. 11, 1995

[54] REAL TIME PASSIVE THREAT POSITIONING SYSTEM

[75] Inventors: My Tran; John E. Rasinski, both of Albuquerque; Michael J. Garsik, Rio Rancho, all of N. Mex.

[73] Assignee: Honeywell Inc., Minneapolis, Minn.

[21] Appl. No.: 977,328

[22] Filed: Nov. 17, 1992

[51] Int. Cl.⁶ .......................... G01S 7/36; G01S 7/38; H04K 3/00
[52] U.S. Cl. ...................... 342/13; 342/189; 342/15
[58] Field of Search ...................... 342/13, 14, 15, 16, 342/17, 18, 19, 20, 189, 192, 195

[56] References Cited

U.S. PATENT DOCUMENTS

| | | | |
|---|---|---|---|
| 3,665,464 | 5/1972 | Meilander | 343/6.5 R |
| 4,700,191 | 10/1987 | Manor | 342/13 |
| 4,891,648 | 1/1990 | Jehle et al. | 342/20 |
| 5,063,385 | 11/1991 | Caschera | 342/13 |
| 5,122,801 | 6/1992 | Hughes | 342/13 |
| 5,128,679 | 7/1992 | Moffat | 342/13 |
| 5,287,110 | 2/1994 | Tran | 342/13 |

*Primary Examiner*—John B. Sotomayor
*Attorney, Agent, or Firm*—Craig J. Lervick

[57] ABSTRACT

A data correlated real time passive threat positioning system uses parallel estimated navigation filters. A threat data correlation process accepts radar warning receiver track file data and generates correlated threat data. A threat data management system and a raw threat positioning system accepts aircraft heading and angle of arrival of the threat to generate a threat status indicator and a threat position measurement. Navigation filtering management apparatus accepts the threat status indicators and provide position filter controls. Parallel estimation navigation filters use the position filter control and the threat of position measurements to generate estimated threat positions for a number of threats. The estimated threat positions are updated and threat situation awareness is presented to the pilot in real-time. Elevation extraction apparatus uses a terrain data base and the threat estimated position to predict the elevation of the threat. Threat data including latitude, longitude and elevation is provided to other systems.

18 Claims, 7 Drawing Sheets

REAL TIME PASSIVE THREAT POSITIONING SYSTEM

UNITED STATES GOVERNMENT RIGHTS

The United States Government has acquired certain rights in this invention through government Contract No. DAA B07-87-C-H041 awarded by the Department of the Army.

BACKGROUND OF THE INVENTION

1. Field of the Invention

This invention relates to an aircraft survivability system and more particularly to a stand alone threat positioning system for passive threats done in real time.

2. Discussion of the Prior Art

In the prior art, individual aircraft survivability equipment (ASE) sensors are used as stand-alone systems. The use of such systems in a stand-alone manner results in high pilot workloads. Further, in such systems only a limited amount of threat data is presented to the pilot. Data provided by various ASE subsystems such as pulsed radar jammers, CW radar jammers and missile approach detectors have previously not been used to provide a comprehensive and coherent picture of the threat environment. Thus prior art systems often do not present adequate data in a readily understood format to enable the pilot to quickly and completely assess a given threat environment.

SUMMARY OF THE INVENTION

In contrast to the prior art, the present invention provides a system whereby the position of aircraft survivability equipment detected threats are determined in real time. The position of a detected threat is displayed to a flight crew to access the threat situation without resorting the information from other aircraft survivability platforms. The law of triangulation is used to compute the distance from the detected threat to the aircraft. An inverse geodetic algorithm using the given position and the angle of arrival with regard to true north and the distance from the threat to the initial position of the aircraft is used to determine the raw position of the threat. The position of the threat detected is computed in terms of geodetic coordinates latitude and longitude. These parameters are fed to an estimation filter for further refinement. The resolution of the threat position improves over time which is indicated by a set of accuracy indices. Discrete estimation position filters are processing in parallel to provide best estimated threat positions and accuracy indices.

The stand alone real time passive threat positioning system of the invention provides estimated threat positions and accuracy indices from a pipeline parallel estimation filters. From the estimated positions, the elevation associated with each position is obtained from a terrain extraction apparatus. Latitude, longitude, altitude and accuracy index are the final products of the parallel estimation navigation filters. The elevation extracted from the terrain data base is combined with threat information such as threat type, threat mode, frequency, PRI, and etc. to instantaneously present the tactical threat situation to the flight crew in real time. Having such an instantaneous presentation, the flight crew can better assess the threat situation. This data is also prepared, formatted and packaged for transmitting to observation platforms, operational platforms, and the ground-base station through a high speed data-link.

Other objects, features, and advantages of the invention will be apparent from the Description of the Preferred Embodiment, claims and Drawings herein wherein like elements have like reference characters.

DESCRIPTION OF THE PREFERRED EMBODIMENT

Figure 1:
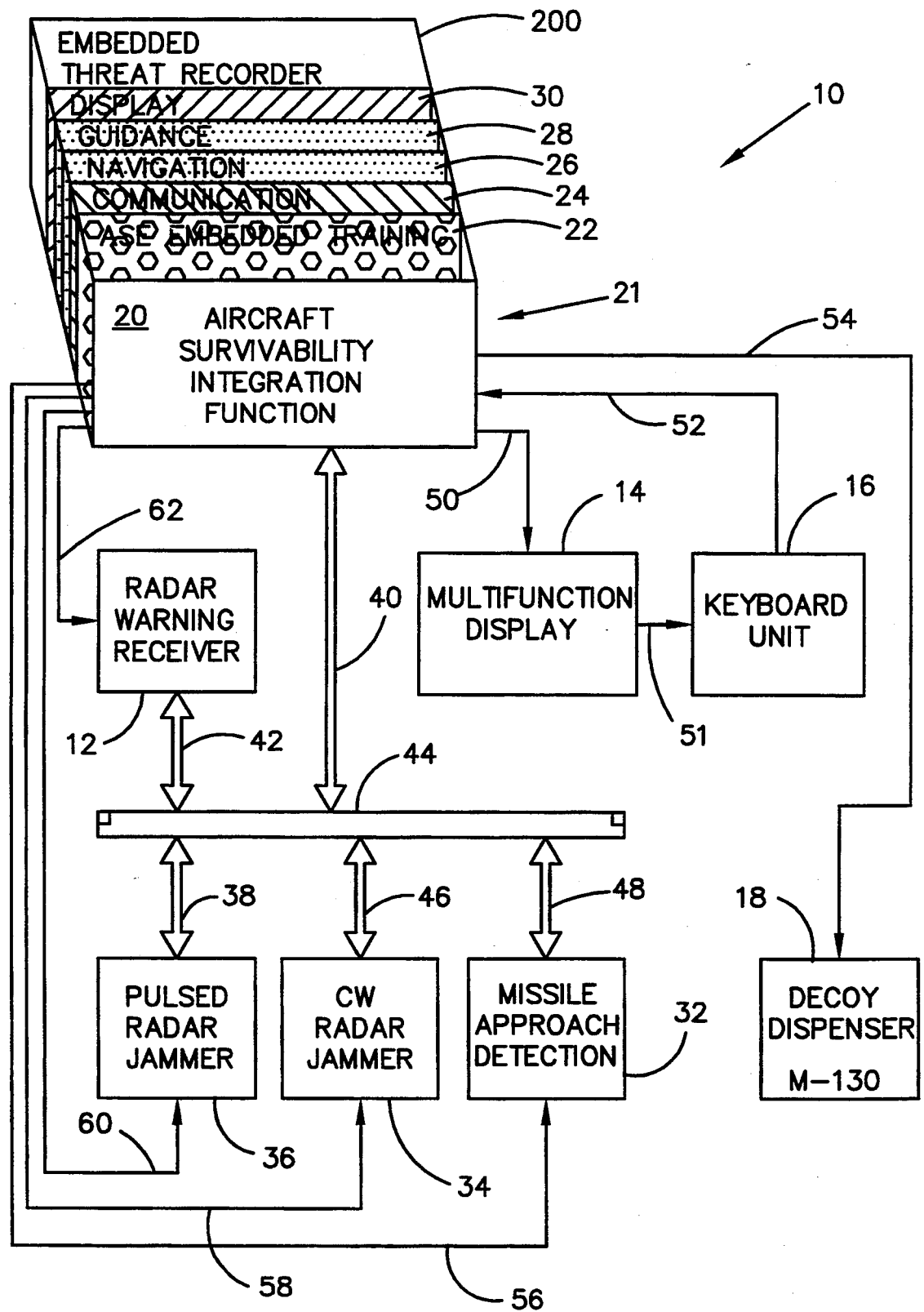
FIG. 1 shows a high level system diagram of one embodiment of the aircraft survivability integration equipment system as employed by the invention.

Now referring to FIG. 1, a high level system diagram of one embodiment of the aircraft survivability integration equipment system 10 as employed by the invention is shown. Aircraft survivability system 10 includes aircraft survivability integration functions 21, a multifunction display 14, a keyboard unit 16, a continuous wave (CW) radar jammer 34, a missile approach detector 32, a pulsed radar jammer 36, a radar warning receiver 12 and a decoy dispenser 18. The aircraft survivability integration functions 21 further include an aircraft survivability integration function 20, an aircraft survivability equipment embedded training apparatus 22, communication apparatus 24, navigation apparatus 26, guidance apparatus 28, display apparatus 30 and an embedded threat data recorder 200. The radar warning receiver 12, pulsed radar jammer 36, CW radar jammer 34, missile approach detector 32, multifunctional display 14, keyboard unit 16 and decoy dispenser 18 are standard units. The radar warning receiver 12, pulsed radar jammer 36, CW radar jammer 34 and missile approach detector 32 all communicate with each other and the aircraft survivability integration functions 21 through a data bus 44. The data bus 44 may advantageously be a MIL standard 1553 data bus or equivalent. In one example of the invention, the radar warning receiver (RWR) 12 communicates with the data bus through communication lines 42, the pulsed radar jammer 36 communicates with the data bus through communication lines 38, and the CW radar jammer 34 communicates to the data bus by communication lines 46, and the missile approach detector 32 communicates to the data bus by communication lines 48. In this way, the sensors in the system which comprise the radar warning receiver 12, pulsed radar jammer 36, CW radar jammer 34 and missile approach detector 32 can receive and transmit data to the aircraft survivability integration functions 21. In addition, the aircraft survivability integration functions 21 may be hardwired to the plurality of sensors. This introduction of hardwired lines to the individual sensors provides a redundancy feature in the system which guards against failure of the data bus 44. For example, the radar warning receiver may be wired by lines 62 into the aircraft survivability integration function 20, the pulsed radar jammer by lines 60, the CW radar jammer by lines 58 and the missile approach detector by lines 56. Hard wire and bus interfaces are typically provided with such ASE devices as are conventionally available.

The multifunction display 14 is controlled by the display apparatus 30 and is wired to the display apparatus 30 in aircraft survivability integration function 20 by lines 50. The multifunction display also interfaces with the keyboard unit 16, which may be a standard keyboard unit, by lines 51. The keyboard unit 16 is also wired into the communication apparatus 24 by lines 52. Control lines 54 are connected from the ASE integration functions 21 to the decoy dispenser 18.

Figure 2:
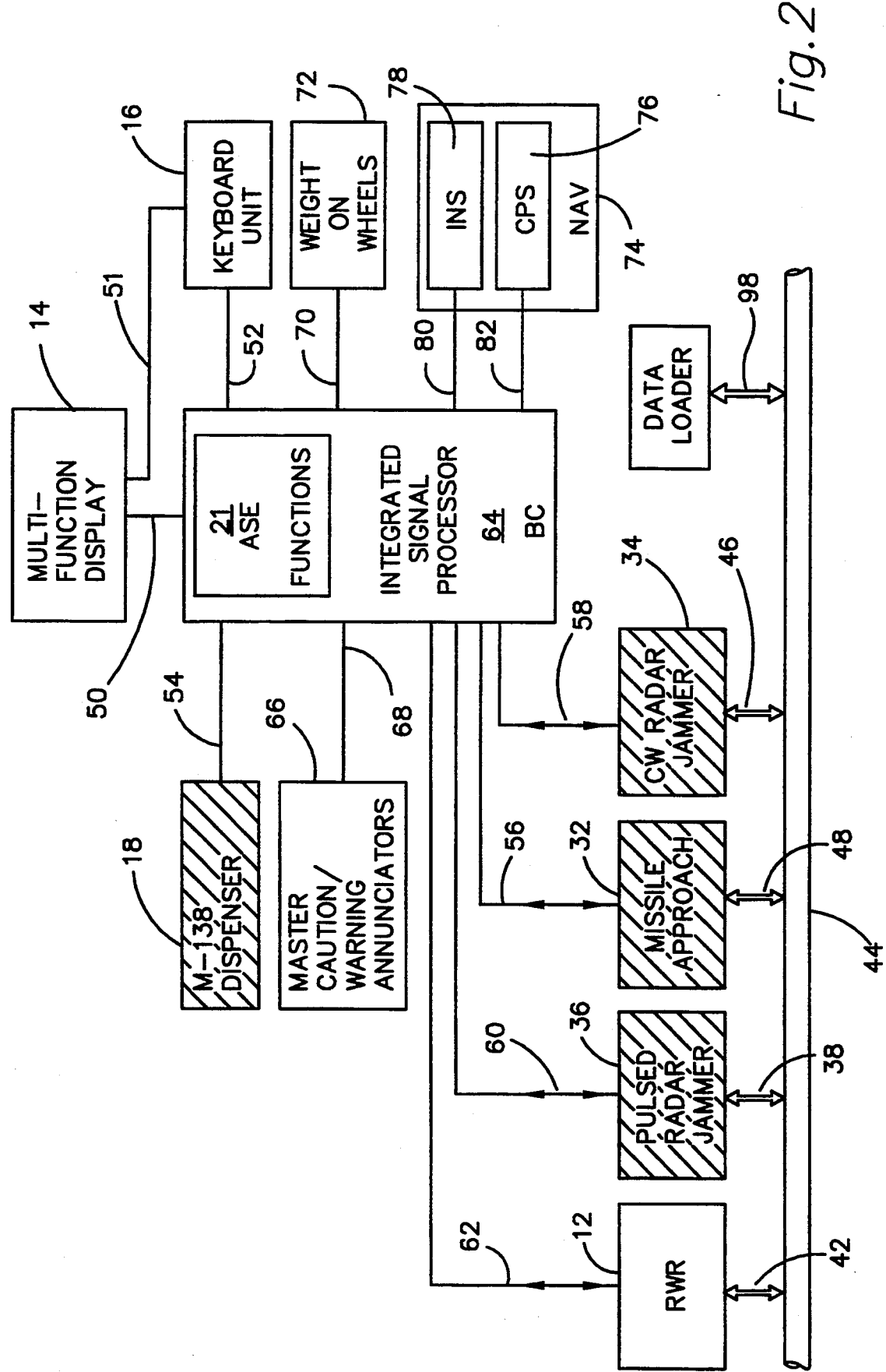
FIG. 2 shows a more detailed block diagram of the aircraft survivability equipment integration system 10 which is integrated into an aircraft survivability equipment/avionics control system (ASE/ACS).

Now referring to FIG. 2, a more detailed block diagram of the aircraft survivability equipment integration system is shown as integrated into an aircraft survivability equipment/avionics control system (ASE/ACS). The aircraft survivability equipment/avionics control system is used to integrate control and display of an ASE suite of devices such as the radar warning detector and jammers as well as selected military communication and navigation systems. Those skilled in the art will understand that the configuration shown in the block diagram of FIG. 2 is one example and does not so limit the invention. In the system shown in FIG. 2, the aircraft survivability integration functions 21 is embedded in an integrated signal processor 64. The integrated signal processor 64 may advantageously comprise a microprocessor, digital signal processor or an equivalent device. Also connected to the integrated signal processor 64 is a master caution/warning annunciator 66 which is connected to the integrated signal processor 64 by line 68, a weight on wheels sensor 72 which is connected by line 70, and navigation systems 74 which are connected by lines 80 and 82. The navigation equipment advantageously includes an inertial navigation system (INS) 78 and a global positioning system (GPS) 76. A data loader 96 is connected via lines 98 to bus 44. The data loader 96 is a conventional data loader and may be used to input flight information and other parameters into the signal processor 64 prior to an aircraft embarking on a particular flight plan. The other components are as shown in FIG. 1 and operate similarly. Those skilled in the art will recognize that the ASE equipment including the radar warning sensor, jammers and missile approach detector are well known standard units.

The weight on wheels sensor 72 is a known sensor which communicates with the signal processor 64 and provides an enable signal 70 which enables certain built-in test functions to be performed when the aircraft is on the ground. These built-in test functions may be a part of the radar warning receiver 12, the pulsed radar jammer 36, the missile approach detector 32 and the continuous wave radar jammer 34.

The integrated signal processor 64 also serves as a bus controller using well known control signals. The four ASE subsystems, RWR 12, pulsed radar jammer 36, missile approach detector 32 and CW radar jammer 34 may be advantageously configured as remote terminals.

The ASE/ACS system provides a fail active state with regard to the ASE suite. If, for example, the integrated signal processor 64 should fail, or power is removed from the unit, the ASE subsystems may assume their most active states. The ability to fire flares and chaff is not impaired by a data bus failure in this redundant configuration. In order to insure this, flare and chaff fire switches are wired directly into the decoy dispenser 18 and are not controlled by the ASE/ACS in the event of a data bus failure. In the alternative, the decoy dispenser 18 may be fired automatically through the aircraft survivability integration functions 21 when an appropriate signal is received from any one or more of the subsystem sensors, such as the radar warning receiver.

Figure 6A:
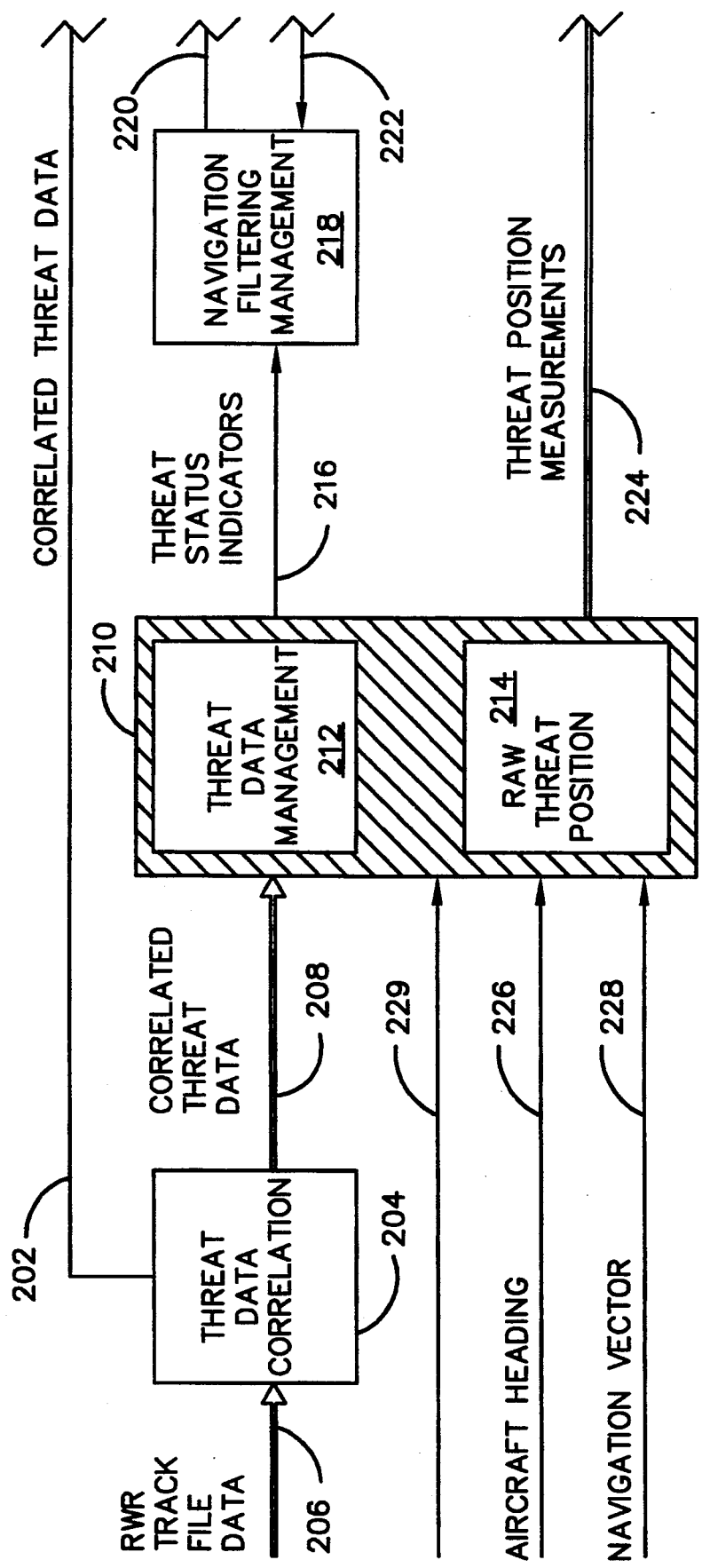
FIG. 6a and 6b show functional block diagrams of the real time passive threat positioning system.
Figure 6B:
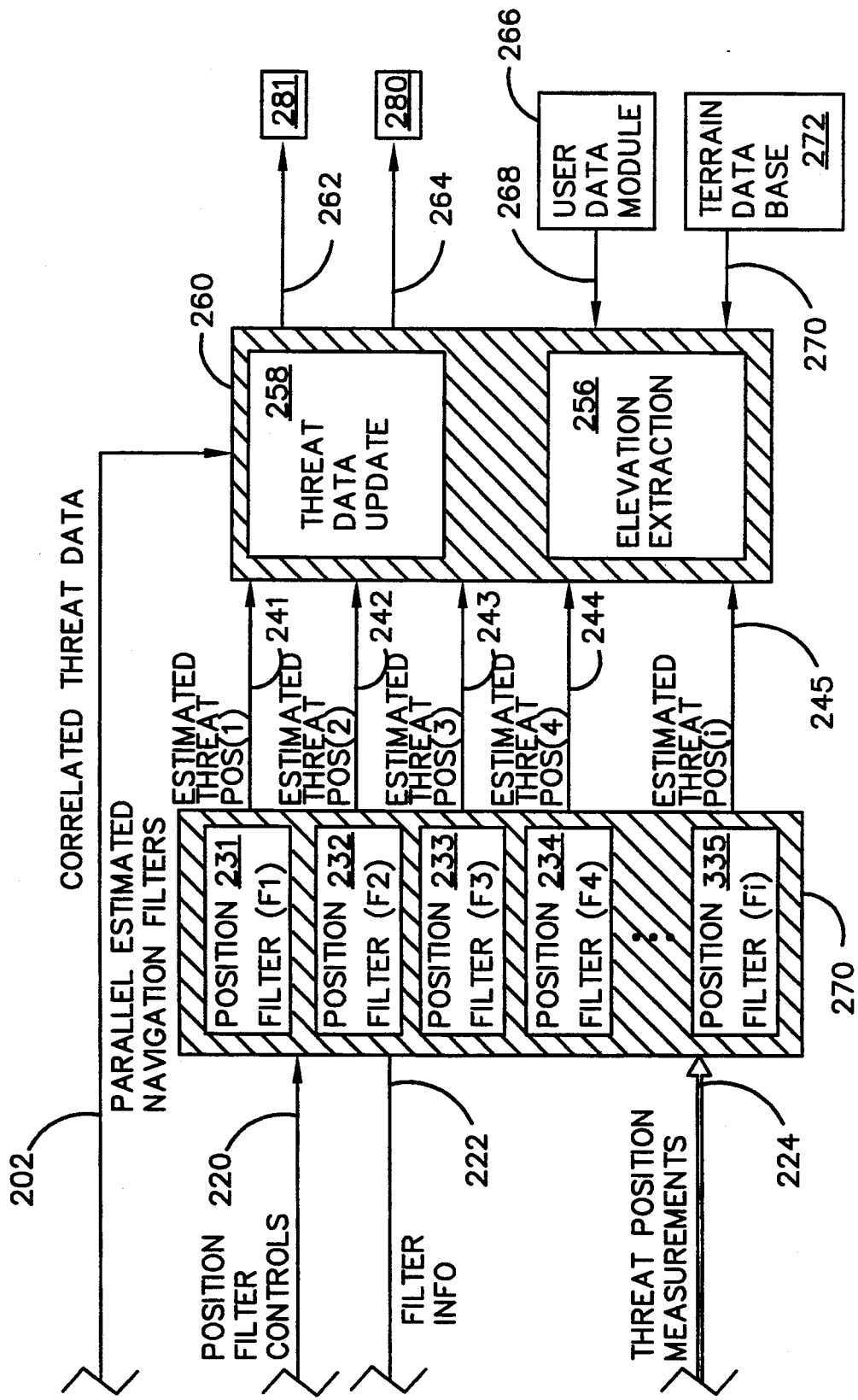

Now referring to FIG. 6 which shows the real time passive threat positioning apparatus of the invention. A radar warning receiver track file data 206 is an input to a threat data correlation process apparatus 204. Correlated threat data 208 is provided to threat data and position structure 210 comprising a data management apparatus 212 and a raw threat position apparatus 214. An aircraft heading 226 is also provided to the threat data management apparatus 212 and the raw threat position apparatus 214 as well as a navigation vector 228. The threat data correlation apparatus also provides a correlated threat data output 202 to threat data update and evevation extraction structure 260 comprising a threat data update apparatus 258 and an elevation extraction apparatus 256. A threat position measurement 224 is provided by the threat data management apparatus 212 and the raw threat position apparatus 214. The threat position measurements are provided to parallel estimation navigation filters 270. A navigation filtering management apparatus 218 provides position filter controls 220 to the parallel estimation navigation filters 270. The parallel estimation navigation filters provide the navigation filtering management apparatus 218 with filter information 222 so that the navigation filtering management apparatus can properly manage the information flow to the parallel estimation navigation filters 270.

The parallel estimation navigation filters 270 provide a predetermined number of estimation filters shown as filters 231, 232, 233, 234 . . . and so on to the last filter 335. The parallel estimation navigation filters 270 provides estimated threat positions 241–245 to the threat data update apparatus 258 and the elevation extraction apparatus 256. The threat data update apparatus provides display data 262 and data link data 264. The elevation extraction apparatus 256 uses data from the terrain data base 272 and estimated threat position inputs 241–245.

The raw threat position apparatus 214 stores the aircraft information such as position, heading, altitude and threat information, such as angle of arrival from a detected threat at initial threat detection, and subsequently uses it to calculate the threat position measurements outputted on line 224. The threat position measurements are determined by the following steps: 1) compute the distance based on aircraft positions (P1, P2) at initial threat detection and at a subsequent time by inverse geodetic calculations. Then use the law of triangulation with computed distance and two different angles of arrival to a threat, corresponding to (P1) and (P2), to obtain the distance from (P1) to a threat. At step 2), use the direct geodetic calculations with the position of (P1), distance to threat, and bearing angle derived from angle of arrival and heading to generate the coarse threat position and a set of coarse threat positions of detected threats contained in the threat position measurements outputted on line 224.

The apparatus of the invention is self-contained and does not require position aiding from other platforms. The resolution of the threat's position improves with new derived position and in time. Navigation accuracy is provided with accuracy indices. The parallel estimation navigation filters 270 provide both threat positions and accuracy indices.

Threat positioning is provided in real time with quality resolution. Information is presented to the flight crew on display 281. The display 281 can either be a horizontal situation display or a digital map display. The display is used to assess the threat situation. Data is sent to the display 281 through display data line 262. Threat positions are sent through data-link line 264 to other platforms, satellites and/or ground base locations.

The threat data correlation apparatus 204 provides a status for all receiving threats by indicating whether the threat is an "old" or "new" threat. The data correlation is based on radar emitter ID, frequency, PRI, etc. and is a temporal data correlation process discussed below.

The threat data management apparatus 212 determines when to store away the initial values of angle of arrival, aircraft heading and aircraft position. The threat data management apparatus 212 initiates and controls the process of computing raw threat positions. Threat position measurements 224 are used as the measurement data in the parallel estimation navigation filters 270.

The raw threat position apparatus 214 uses the initial aircraft heading 226 and angle of arrival 229 and subsequent aircraft heading 226 and angle of arrival 229 to compute the great circle distance to the threat. The method of the invention takes the heading change into account in order to adjust the angle of arrival 229. Once the great circle distance is obtained from the calculations, a direct geodetic method is used, given bearing and distance and initial aircraft position, to complete the raw threat position. The outputs of the method are defined in terms of latitude and longitude.

The aircraft's position 226 is provided by a standard Global Positioning System (GPS) or inertial navigation system (INS) aided by the GPS.

The navigation filtering management apparatus 218 monitors the number of "old" and "new" threats. The apparatus 218 determines the filtering process requirement such as filtering start-up, filter initiation, solution convergence, and the number of parallel filters needed. The apparatus also tracks the number of active filters. The accuracy indices are used to determine the level of accuracy for the estimated threat position and to also monitor the steady state error for final resolution. A filtering process is deactivated when no refinement is made on the resolution, as, for example, when there is steady state error.

The parallel estimation navigation filters 270 are a bank of parallel discrete kalman filters, constructed and operated in parallel fashion. Each filter is assigned a sequence number and the ID of current processed threats. Each filter has two states, latitude and longitude. The filters estimate threat positions in terms of latitude and longitude and provide accuracy indices. Accuracy indices are represented by a number from 9–1 based on the estimated error, where 9 being the least accurate and 1 being the most accurate.

The elevation extraction apparatus 256 uses the terrain data base and final estimated threat position to determine elevation. The sub-grid position is located on a digital map. Once the sub-grid is located the method of the invention uses a known second degree curve fit elevation interpolation technique to estimate the elevation. A sub-grid is defined as a partial grid on a map partition which contains the elevation information for a threat position.

The threat data update apparatus 258 combines the threat related information, the estimated threat position, elevation, and accuracy indices into data records. This data is formatted and sent to the data-link controller 280 to disassemble the data for communication to various designated functions—surveillance platforms, operation platforms, and ground base stations.

Based on the user information 268 provided by the user data module 266, containing information related to threats range affectivity, the method of the invention performs threat zone computations. The computations are based around the terrain around the threat and the threat elevation along the flight plan. This information is displayed to the flight crew to assess the threat situation.

Figure 3:
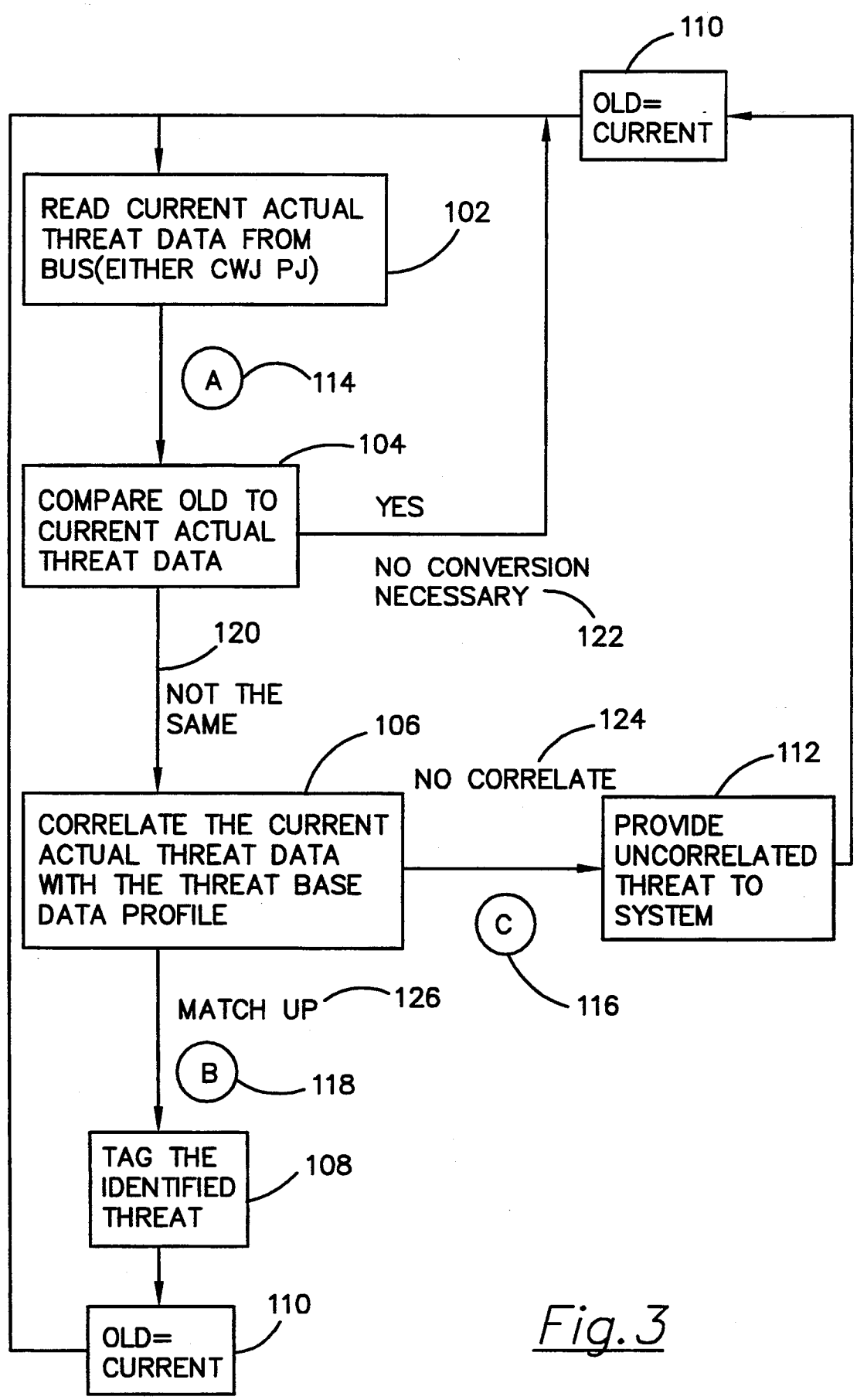
FIG. 3 shows a method of the invention that is used to convert the current actual threat data, that is sent to the system bus from either the continuous wave radar jammer or the pulsed radar jammer, to either an un-correlated threat or an identified threat.

Now referring to FIG. 3 which shows the method of the invention used to convert current actual threat data from the system data bus from either the continuous wave radar jammer or the pulsed radar jammer to either an un-correlated threat or an identified threat. The threat data base is composed of a number of sub-elements and parameters. A threat data base may be input into the system and stored in memory by any well-known means. The threat data base advantageously contains threat parameters including threat types which include, in one preferred embodiment of the invention, a missile, anti-aircraft gunfire, a fighter, or other threats identified by the aircraft. Each threat type has an associated set of parameters which, in one preferred embodiment of the invention, include frequency of the threat signal, amplitude of the threat signal, pulse repetition frequency, pulse repetition interval, angle of arrival, and operational mode of the threat. Those skilled in the art will recognize that other parameters may be used in the method of the invention. Those skilled in the art will recognize that either all the parameters may be included in the threat data base or just a few. The threat data base comprises a profile of known threats that may be encountered by the aircraft.

FIG. 3 shows the processing of data from a current actual threat as read from the jammer radars. The threat data is provided on the data bus 44 as shown in FIGS. 1 and 2. The process of the invention starts at step 102 wherein the current actual threat data from the data bus is read. This data is also available directly to the system processor 64 from the hardwired connections 58, 60 and from the radar jammers 34, 36. Those skilled in the art will recognize that the bus method of communication provides more threat information. The process flows to step 104 where previously received old threat data is compared to just received current actual threat data. Step 104 compares on a logical basis the old detected threat and the current detected threat. The comparison of different threat data occurs in different time slices. The old threat data occurred at the last sample period as indicated in step 110. The comparison of the various threat data parameters can occur either through known accepted methods such as boolean comparisons or threshold comparisons which compare an upper bound to a lower bound of the parameters, or a comparison of whether or not the parameters are within a window of parameter values. Alternate methods of comparison understood by those skilled in the art may be used such as fuzzy logic-based comparisons. The process flows to step 106 if the system is in a state that indicates the old and the current actual threat data is not the same. At step 106 the process correlates the current actual threat data with threat profiles from the threat data base. In one preferred embodiment of the invention, the current actual threat is compared against each element of the threat data base using the comparison methods used in step 104. If the threats correlate and match up as indicated by state 126, the process flows to step 108 where the identified threat is tagged. The process then flows to step 110 to set the old actual threat data to equal the current actual threat data. The process then returns to step 102.

Figure 5:
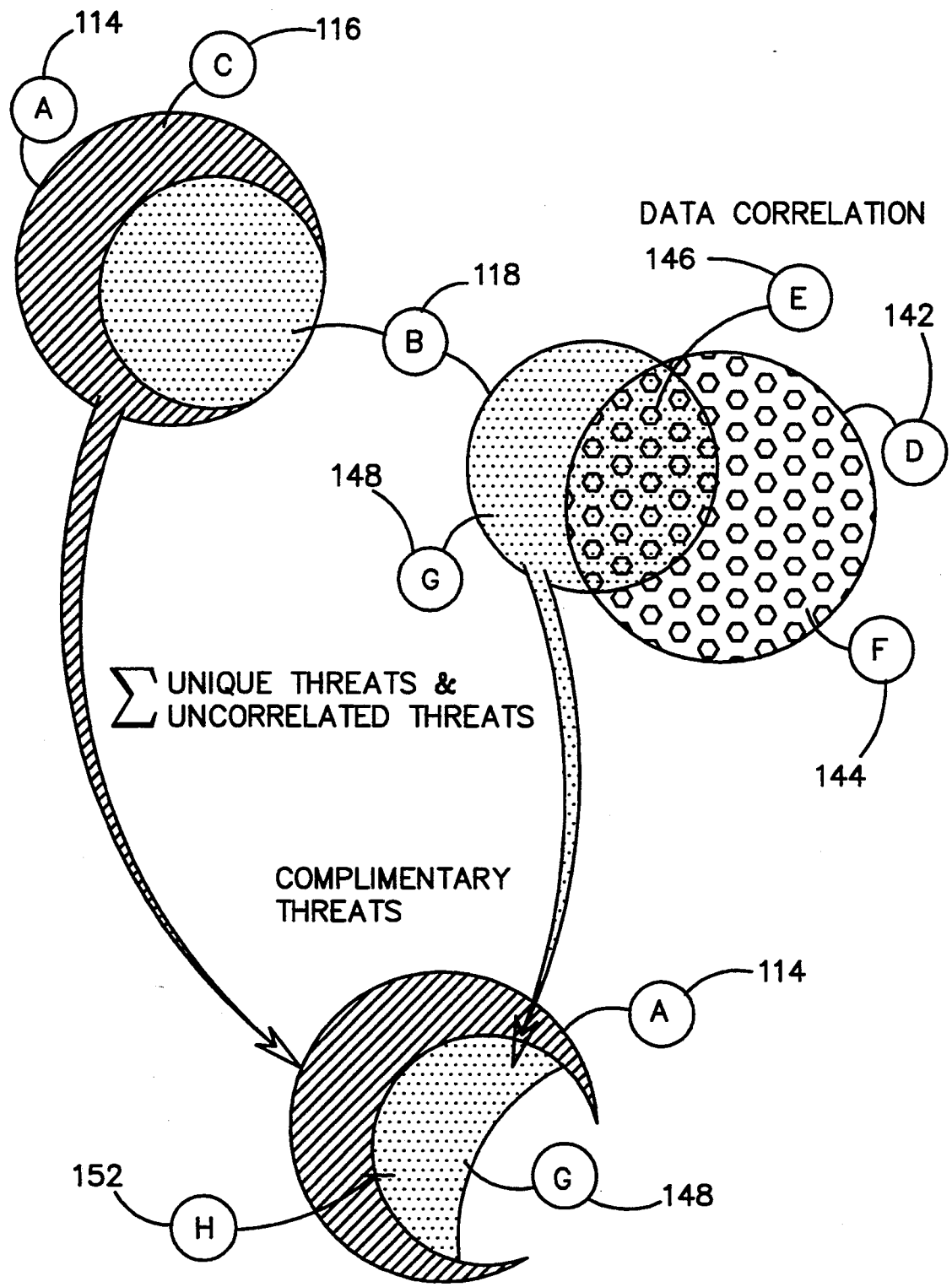
FIG. 5 shows a data flow diagram showing the various data sets of the invention in a Venn diagram fashion.

In the method of the invention, the processor creates different sets of data which are correlated as shown in FIG. 5 which is described in detail below. At step 102, the process takes data from one of the radar jammers which is designated as data set A 114. In step 106, a data set labeled C 116 is generated which represents an un-correlated current actual jammer threat data. This data is presented to process step 112 to provide un-correlated threat data to any system using the method of the invention. The process then flows to step 110 which sets the old threat data to the current threat data. Next, the process returns to step 102. The process step 106 generates a data set called B 118 which is the matched-up correlated current actual jammer threat data. If in process 104 the comparison to check old threat data against current threat data results in the old and the current being the same, then the process flows to step 102 to read the next current actual threat data from the bus or from the hardwired system.

Figure 4:
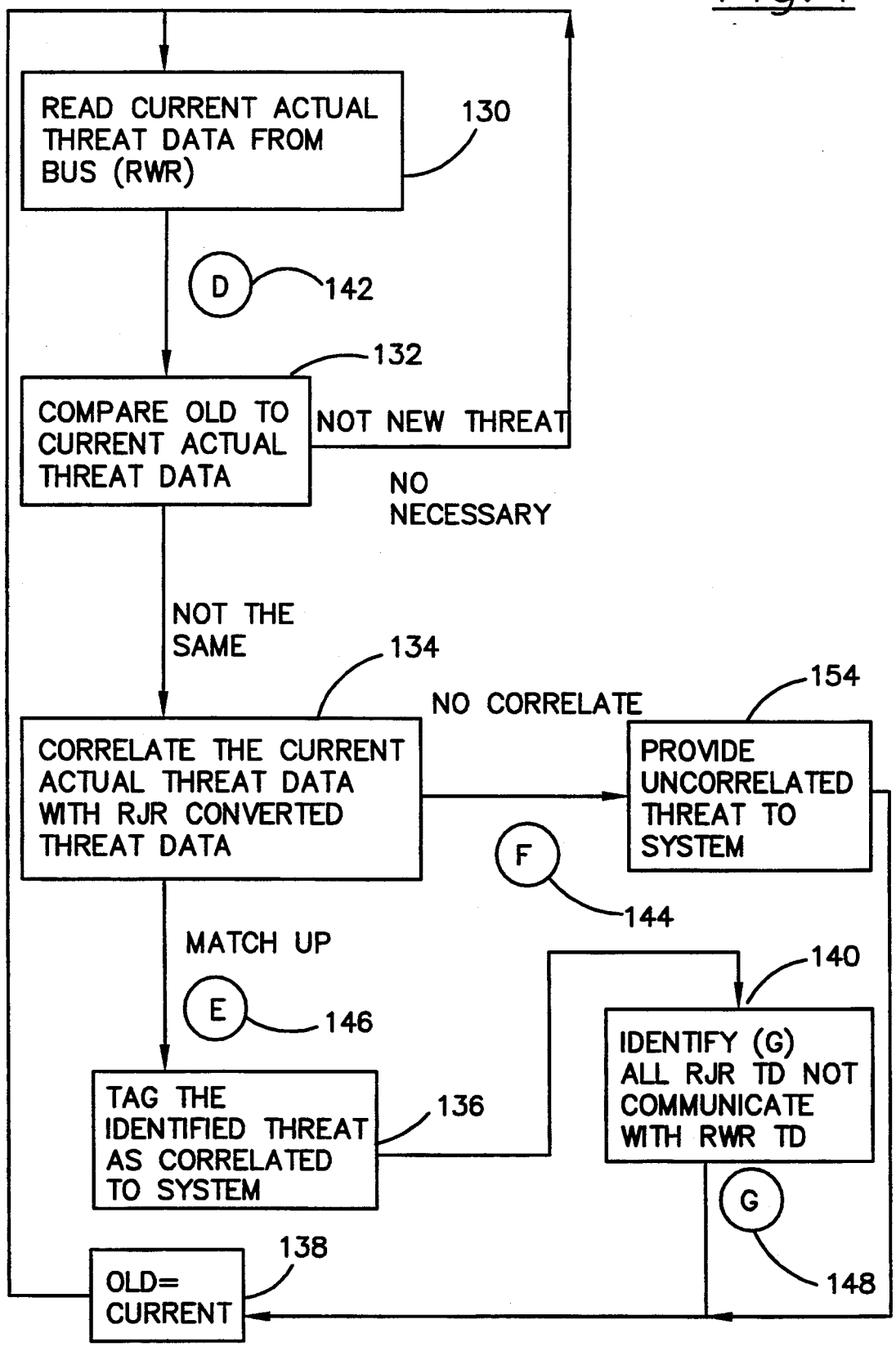
FIG. 4 shows one method of the invention used to perform data correlation on radar warning receiver data.

Referring now to FIG. 4, the method of the invention used to perform data correlation on radar warning receiver data is shown. The process starts at step 130 where the current actual threat data from the radar warning receiver is read from the data bus. The process 130 generates data set D 142. Data set D is then used by process step 132 to compare the current actual threat data with old threat data from the radar warning receiver. If the two threats are identical (i.e. the old and the current in step 132), the process returns to step 130 to read another actual threat. Step 130 reads in all available threats from the radar warning receiver. The set of all possible threats is commonly known as a threat set. In step 132, the old threat set is compared against a current actual threat set data. If the current actual threat set data is not a new threat set, then the process flows to 130 to scan another set of threats. In step 132, if there is a new threat, the process flows to step 134 to which correlate the current actual threat set of the radar warning receiver with the threat data of the radar jamming receiver conferred by the process shown in FIG. 3. The threat data is indicated by set B. If the converted threat data set B correlates with the current actual threat data set, then the process flows to 136 to tag the identified threat set as a correlated new threat to the system using the method of the invention. The process then flows to step 140 where the process identifies a set G 148 which is all radar jamming receiver threat data that is not common with the radar warning receiver threat data. The process then flows to step 138 to set the old threat data set as the current threat data set for the next comparison and the next time cycle. The process then flows to 130 to read the next current actual threat data set from the bus.

In step 134, if there is no correlation between the current actual threat data set with the radar jamming receiver converted threat data set, the process flows to step 154, generates an un-correlated threat set F 144, and provides the un-correlated threat set to the system using the method of the invention.

As is the case with the jammer data, when implementing the method of the invention to convert the current actual threat data set from the radar warning receiver to either a correlated or un-correlated threat, the process creates various other data sets. Data set D 142 is the current active threat data set from the bus. Data set E 146 is the correlated current actual threat data with the radar jamming receiver converted threat data. Data set F 144 is the uncorrelated data. Data set G is the data which is not common with the radar warning receiver threat data 148.

Now referring to FIG. 5, a data flow diagram showing the various data sets of the invention in a Venn diagram fashion is shown. Data set A 114 is the current actual jammer threat data. Data set B 118 is the correlated current actual jammer threat data or the converted set data. Data set C 116 is the un-correlated actual jammer threat data. Data set D 42 is current actual radar warning receiver threat data. Data set E 146 is the common current threat data. Data set F 144 is the un-correlated radar warning receiver threat data. Data set G 148 is the radar jamming receiver threat data which is not common with the radar warning receiver threat data. Data set G is used subsequently to generate a complementary threat set H 152. Data set H 152 is the complimentary threat data set which represents the summation of data sets C and G.

The two basic processes shown in FIG. 3 and FIG. 4 are joined in this data flow diagram of FIG. 5. Two basic data sets include the data from the radar jamming receivers which is data set A 114, and the radar warning receiver which is data set D 142. The process of FIG. 3 generates the data set B 118 which represents all correlated current actual jammer threat data sets. This is used by both processes shown in FIG. 3 and FIG. 4 to create a complimentary threat. The data set B 118 is subtracted from data set A 114 to generate data set C 116 which is the un-correlated current actual jammer threat data. Data set B 118 is also used along with the data set D 142 (current actual radar warning receiver threat data) to generate the intersection of the two data sets E 146. The data set E 146 is the common current threat data. The common current threat data is then subtracted from data set B 118 to generate a new data set G 148. Data set G 148 represents the radar jamming receiver threat data that is not common with the radar warning receiver threat data. That is, data set G 148 represents data from threats which are detected by the jammers, but not the radar warning receiver. Data set G 148 and data set C 116 are combined to create data set H which is called the complementary threat data. The complementary threat data set H comprises threats that are complementary to the already identified threats which have been identified by the radar warning receiver.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A real time passive threat positioning apparatus for an aircraft survivability equipment system comprising:
   (a) a threat data correlation apparatus having a radar warning receiver track file input and a correlated threat data output;
   (b) a threat data management apparatus having an input connected to said correlated threat data output and a threat status indicator output;
   (c) a raw threat positioning apparatus having an angle of arrival input operatively connected to an angle of arrival threat data output, an aircraft heading input and a navigational vector input, said raw threat positioning apparatus providing a threat position measurement output;
   (d) a navigation filtering management apparatus for controlling estimation filters and having a filter information input operatively connected to said threat status indicator output, said navigation filtering management apparatus providing a filter position control output; and
   (e) at least one parallel estimated navigation filter apparatus for estimating at least one estimated threat position, said parallel estimated navigation filter apparatus providing an output and having an input connected to said filter position control output and at least one input connected to said threat position measurement output.

2. The real time passive threat positioning apparatus of claim 1 wherein said parallel estimated navigation filter apparatus comprises a kalman filter.

3. The real time passive threat positioning apparatus of claim 1 wherein the estimated threat positions are communicated from said parallel estimated navigation filter means to a threat data update apparatus for displaying the threats on a multifunction display.

4. The real time passive threat positioning apparatus of claim 1 wherein the estimated threat positions are provided to an elevation extraction apparatus for determining the elevation of the threat.

5. The real time passive threat positioning apparatus of claim 4 wherein said elevation extraction apparatus comprises a terrain reference navigation data base means, wherein the elevation of the estimated threat is determined from said terrain data base means.

6. The real time passive threat positioning apparatus of claim 5 further comprising a user data module operatively connected to said elevation extraction apparatus.

7. The real time passive threat positioning apparatus of claim 1 wherein said threat data management apparatus provides a status indication of whether a threat is an old threat or a new threat on said threat status indicator output.

8. A real time passive threat positioning data correlation method comprising the steps of:
   (a) reading current threat data from a radar warning receiver;
   (b) comparing old threat data to the current radar warning receiver threat data and determining if the old threat data is the same as the current threat data, if it is, returning to step (a);
   (c) correlating the current radar jammer receiver threat data with a radar warning receiver converted threat data base and determining if there is a correlation, if there is not a correlation, providing the identified uncorrelated threat to an aircraft survivability system, switching the current threat to be the old threat and reverting to step (a);
   (d) tagging the identified threat as the correlated threat to the system;
   (e) identifying all threat data radar jammer not in common with threat data from the radar warning receiver;
   (f) converting the current threat to be the old threat; and
   (g) reverting to step (a).

9. The real time passive threat positioning apparatus of claim 1 further comprising means for providing threats in real time to one or more airborne platforms, space platforms and ground bases.

10. An integrated aircraft survivability equipment apparatus comprising:
    (a) data bus means having a data bus control input;
    (b) means for aircraft survivability integration having a multifunction display output, a data bus control output connected to the data bus control input, a radar warning receiver control output, a pulsed radar jammer control output, a continuous wave radar jammer control output, and a missile approach detector control output said means for aircraft survivability further including a real time passive threat positioning means and a threat positioning output;
    (c) radar warning receiver means connected to said data bus means, said radar warning receiver means having a radar warning receiver control input connected to said radar warning receiver control output;
    (d) pulsed radar jammer means connected to said data bus means, said pulsed radar jammer means having a pulsed radar jammer control input connected to said pulsed radar jammer control output;
    (e) continuous wave radar jammer means connected to said data bus means said continuous wave radar jammer means having a continuous wave radar jammer control input connected to said continuous wave radar jammer control output;
    (f) missile approach detector means connected to said data bus means, said missile approach detector means having a missile approach detector control input connected to said missile approach detector control output; and
    (g) multifunction display means having a multifunction display input connected to the multifunction display output, the multifunction display means further connected to a keyboard control unit.

11. The integrated aircraft survivability equipment apparatus of claim 10 further comprising means for providing estimated threat positions to threat data update means for displaying the threats on said multifunction display.

12. The integrated aircraft survivability equipment apparatus of claim 11 further comprising means for providing estimated threat positions to elevation extraction means for determining the elevation of the threat.

13. The integrated aircraft survivability equipment apparatus of claim 12 wherein the elevation extraction means further comprises a terrain reference navigation data base means for positioning the estimated threat within the data base means and for determining the elevation from the terrain data base means.

14. The integrated aircraft survivability equipment apparatus of claim 10 further comprising a user data module.

15. The integrated aircraft survivability equipment apparatus of claim 10 wherein said real time passive threat positioning means comprises means for correlating data from said radar warning receiver means.

16. The integrated aircraft survivability apparatus of claim 10 comprising means for providing threats in real time to airborne platforms, space platforms and ground bases.

17. The integrated aircraft survivability equipment apparatus of claim 10 wherein said means for aircraft survivability integration comprises a threat avoidance control output and the integrated aircraft survivability equipment apparatus further comprises threat avoidance means having a threat avoidance input connected to said threat avoidance control output.

18. The integrated aircraft survivability equipment apparatus of claim 10 wherein said means for aircraft survivability integration further comprises a decoy dispenser control output and said integrated aircraft survivability equipment state machine apparatus further comprises decoy dispenser means having a decoy dispenser input connected to the decoy dispenser control output.

* * * * *